United States Patent [19]

Lemaitre

[11] 3,881,711

[45] May 6, 1975

[54] ELASTIC SUPPORTS

[75] Inventor: Jean-Claude Lemaitre, Verneuil, Seine, France

[73] Assignee: Paulstra, Levallois-Perret, France

[22] Filed: Jan. 3, 1974

[21] Appl. No.: 430,387

[30] Foreign Application Priority Data
Jan. 12, 1973 France .............................. 73.01135

[52] U.S. Cl. .......................... 267/57.1 R; 267/63 R
[51] Int. Cl. .............................................. F16f 1/16
[58] Field of Search ........... 267/63 R, 63 A, 57.1 R, 267/57.1 A, 152

[56] References Cited
UNITED STATES PATENTS
| | | | |
|---|---|---|---|
| 2,621,923 | 12/1952 | Krotz | 267/57.1 R |
| 3,235,941 | 2/1966 | Krotz | 267/57.1 R |
| 3,467,421 | 9/1969 | Bentley | 267/63 R |
| 3,730,509 | 5/1973 | Jorn | 267/63 R |

*Primary Examiner*—James B. Marbert
*Attorney, Agent, or Firm*—Larson, Taylor and Hinds

[57] ABSTRACT

The support comprises at least one rubber cushion between two tubular reinforcements or coaxial bushes. The inner bush is in at least two elements spaced from one another on mounting by a central mandrel so as to provide a separation between the edges of said elements. The major portion of the cross-section of the elastic cushion facing the respective edges of the two elements of the inner bush defines gaps whose cross-section extends, in the tangential direction, over a distance of the order of two to three times the separation between said edges. The depth of the gaps, in the radial direction, may be almost equal to the thickness of the elastic cushion in the remaining solid portions, and the cross-sections of the gaps may have an eliptical shape.

8 Claims, 5 Drawing Figures

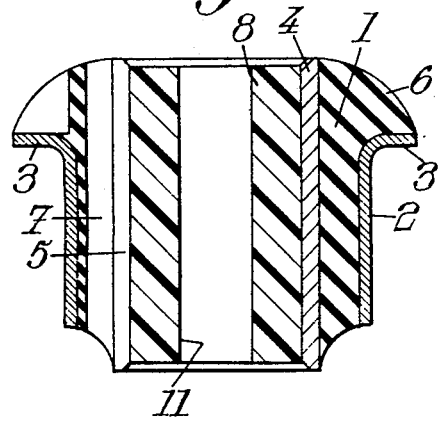
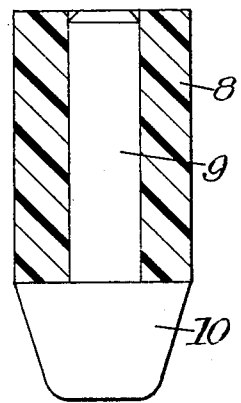
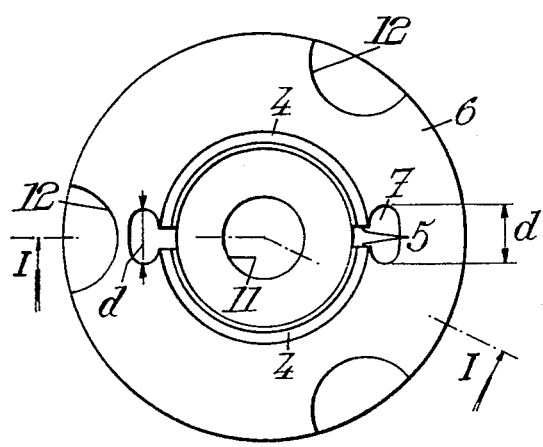
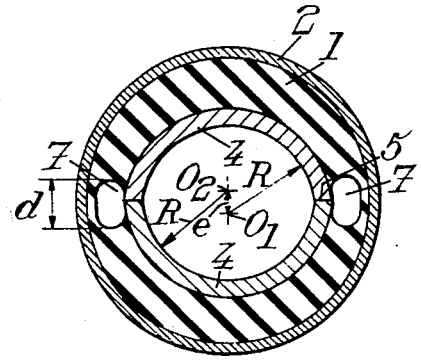
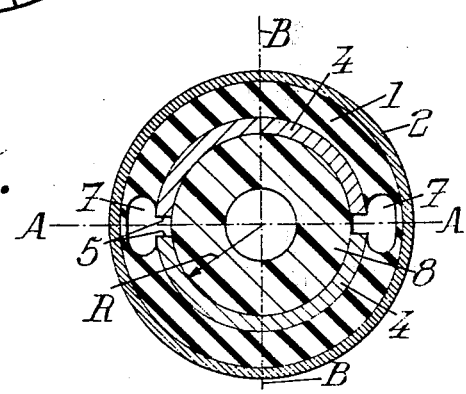

ELASTIC SUPPORTS

The invention relates to elastic supports (this term support being taken in a very general sense and being applicable also to articulations), of the type comprising essentially at least one element of rubber or other elastomer comprised between two bushes, for example metallic and generally coaxial, to which it must adhere.

In particular, the invention is applicable to supports of this type intended to serve as a stop, the outer bush often terminating in this case, at one of its ends, in a collar surmounted by a rubber enlargement thus constituting a more or less stiff axial stop according to the profile of this enlargement.

In such a construction, vulcanisation of the rubber is generally provided by heat treatment in molds at temperatures which can exceed 100°C.

Now, it has been observed that the subsequent cooling is prone to create unfavorable conditions for obtaining good adherence between the rubber and the surfaces, assumed metallic, of the the abovesaid bushes. The reason therefore is that, on this cooling, the rubber, whose coefficient of expansion is much higher than that of the metal, retracts, so that it becomes, consequent upon this retraction, placed in a state of tension between the two metallic bushes. This tension is prejudicial, not only to maintaining good adherence, but also to good behaviour as regards durability under the effect of dynamic stresses.

There have already been proposed means for compensating this tension, means providing for the placing of the rubber in a state of precompression, and realizable in two ways, either by restriction of the outer bush, or by expansion of the inner bush.

The first of these two methods is generally carried out with a die and presents hardly any difficulty when the outer sleeve is entirely cylindrical; however, if it has a collar (the case particularly envisaged by the invention), the operation is much more delicate: it is then necessary to flare the cylindrical barrel into the shape of a skirt on the side opposite the collar and then to restrict it with a die in two parts; the restriction obtained is localised and the operation is long and expensive.

The second method, that is to say by expansion of the inner tube, employs "rolling expansion" (or "beading"). In view of the risks of rupture of the metal, the amplitude of the expansion is limited; on the other hand, the circumferential expansion which results therefrom can cause crazing of the adhesive layer, which is prejudicial to good adhesion.

Finally, these two methods have the drawback of more or less deforming the cores, so that mechanical finishing stages are necessary (truing of the diameters and adjustment of the length).

It has been proposed besides to ensure the stressing or precompression by constituting the inner bush of two hollow elements supported against one another by their respective edges, and, concurrently by molding and by vulcanisation, therein subjecting the assembly, by means of a central mandrel, to expansion tending to separate said elements from one another, from which expansion the said stressing results.

In such a method, the difficulties to avoid tears in the rubber at the place where the two edges facing the above-mentioned hollow elements separate. It has been proposed to leave a small gap at this spot, but this has been shown insufficient.

According to the invention, there are used hollow elements such as mentioned above, to enable the desired stressing to be obtained by separating them, but, in addition, it is arranged so that the major portion of the cross-section of the elastic cushion, facing the respective edges of the abovesaid elements, be replaced by gaps, whose cross-section extends, in the tangential direction, over a distance of the order of 2 to 3 times the separation between the said edges.

In particular, there is given to the cross-section an ovoid form of which the small axis is arranged radially and occupies almost the whole gap between the two inner and outer cores, whilst the large axis is presented in the tangential direction, thereby being of the order of magnitude contemplated above.

There have been produced in this way assemblies which, not only avoid all tearing of the rubber close to the edges of the two elements of the inner core, but which in addition, due to the presence of the abovesaid gaps, give rise to a rigidity, in the radial direction, which is less in the diametric sense passing through the said gaps than in the diametric plane orthogonal to the preceding one: now, in numerous industrial applications of elastic supports of the type concerned, it is desired to obtain such a differentiation of the radial rigidity in two directions at right angles.

The invention consists, apart from these main features, of certain other features which are preferably used at the same time and which will be more explicitly considered below.

It provides, more particularly, of certain types of application (for example those for which it is applied to supports for antivibratory or other machines), as well as certain embodiments, of said features; and it provides, more particularly again and this by way of new industrial products, supports of the type concerned including the application of these same features, as well as the special elements adapted to their construction and the assemblies using such supports, articulations, etc.

It will in any case be well understood by means of the additional description which follows, as well as of the accompanying drawing, which description and drawing are, of course, given primarily by way of indication and are not to be considered as limiting.

FIGS. 1 and 2 of this drawing, show respectively, in axial section along the broken line I—I of FIG. 2 and in plan view in FIG. 1, one embodiment of an elastic support constructed according to the invention.

FIG. 3 is a section through a support of this type, in the course of manufacture.

FIG. 4 shows, in elevational section, a ring mounted on a mandrel and intended to be used to separate the elements of the lower bush shown in FIG. 3.

FIG. 5 shows in section the same assembly, after expansion by the ring of FIG. 4.

According to the invention, and more particularly according to that of its types of application, as well as according to those embodiments, of its various parts, to which it would appear that preference should be given, in order for example to produce elastic supports comprising essentially a rubber cushion 1 interposed between two cores within one another, for example of cylindrical shape, procedure is as follows or in similar manner.

Firstly as regards the outer core, it is constituted by a tubular metallic bush 2 ending advantageously, at least on one side, in a collar 3.

As regards the other part of the inner armature, it is constituted by several elements, that is to say by at least two elements adapted, on molding, to be in contact with one another or the ones with the others, whilst it is possible, on molding or after molding, to separate them from one another so as to cause compression or prestressing of the rubber cushion.

Thus, in the embodiment shown, recourse is had, to constitute this inner armature, to two elements 4, 4 of cambered sheet metal, these two elements having a cylindrical profile, but having an extent a little less than that of a half-cylinder.

It is seen in FIG. 3, that at least at the beginning of molding these two elements of sheet metal 4 are in contact with one another through their longitudinal extreme edges 5. Their radius of curvature being represented by R, it is seen that the two centers $O_1$ and $O_2$ do not coincide, but are displaced with respect to one another by a distance $e$.

However if, as will be explained below, these two elements are separated from one another transversely to the central axis of the support, the assembly can be arranged to have the shape of a cylindre of radius R (FIG. 5) with, this time, the facing edges 5 separated by the above-indicated amount $e$.

This being the case, molding and vulcanisation follows taking care to provide, in the mold, means or cores adapted to generate, along the now contiguous edges 5, longitudinal cavities 7, for example of oval section, the length $d$ of the largest axis of the oval being for example of the order of two or three times the above contemplated distance $e$, whilst the small axis occupies almost the whole of the gap between the two inner and outer reinforcements.

Molding is therefore carried out by introducing the outer reinforcement 2 and the two halves of the inner reinforcement 4, 4 into a vulcanising mold so that the two cups 4 are contiguous, as shown in FIG. 3, the inner space then not being cylindrical, which must take into account obviously the inner centering mandrel of the mold.

Then, having placed in position the cores for obtaining the cavities 5, procedure is conventional for the introduction of the rubber 1 into the annular space separating the two reinforcements, providing therein, if necessary, on the side of the collar 3, an enlargement, as shown at 6 in FIG. 1.

Vulcanisation then follows to effect adhesion of the rubber on the surfaces of the previously treated reinforcements to obtain firm adhesion.

After extraction from the mold, the part is hence in section as shown in FIG. 3.

The rest of the method then consists of introducing, into the central space, means to enable separation of the two elements 4 from one another by a distance substantially equal, which may be less than or greater than, the above contemplated distance $e$.

If the separation is equal to $e$, there is obtained in section an element of the type shown in FIG. 5, and it will be noted that, as a result of this extension, on one hand, the rubber is subject to compressive prestressing, and on the other hand, the lateral gaps 7 are retained, so that the rubber cannot flow back through the slots separating the two facing edges 5.

As regards the means for ensuring this extension, there are constituted for example by a ring advantageously of plastics material 8 which is mounted on a mandrel 9 comprising a conical or similar head 10, so as to facilitate the expansion.

In other words, the expansion is effected by pushing with force the assembly 8, 9, 10 into the central hollow and along the axis of the support.

The presence of the lateral spaces 7 enables any tearing of the rubber to be avoided in line with the contact surfaces of the latter, with the edges or walls of the elements 4. In addition, these spaces confer on the support a radial rigidity greater in the direction B—B perpendicular to the diametric plane A—A separating the two elements 4, hence passing through the said spaces.

In any case, once the operation is terminated, there is obtained a support such as that shown in FIG. 1, where the support 9, 10 has been removed, so that there only remains, at the centre of the support and in contact with the inner reinforcement, the ring 8.

The central passage 11 of this ring will be able to serve for ensuring the passage of the bolt or other member used for fixing the support on the apparatuses or members with which it cooperates.

It is also to be noted that there may be provided, according to a known arrangement, slots 12 (FIG. 2) enabling at the same time the assurance of a fixed position of the outer reinforcement 2 and if necessary the ensleeving of the support in a bore fast to the structures on which it is mounted.

As a result of which, and whatever the embodiment adopted, there can produced elastic supports whose operation emerges sufficiently from the foregoing for it to be unnecessary to dwell further on the subject and which have, with respect to those of the type concerned already existing, numerous advantages, for example:

that of enabling the obtaining of prestressing of the rubber in homogeneous manner in the zones where the rubber works functionally in shear under the effect, either of an axial load, or of a twisting torque, that of ensuring independence of this prestressing with respect to the possibilities of deformation of the metal, since it only depends on the diametric dimensions of the two elements 4 and of the central ring of plastics or other material 8, that of enabling the establishment of two elements (or more) 4, of the central reinforcement of stamped sheet metal, this manufacture being less difficult than that of a sectioned tube, that of enabling, due to the presence of gaps or hollows 7, of conferring on the support a different radial rigidity in two perpendicular diametric planes, such a differentiation being very often desired in various industrial applications, that of avoiding, due to the abovesaid hollows, any tearing of the rubber on prestressing, and that, due to the presence of the central ring 8, of enabling the central passage 11 to be dimensioned to the desired diameter for the fixing bolt, whilst the conventional solution often leads to a central tube with walls oversized in thickness or provided with bracing rings screw-cut at each end.

As is self-evident, and as emerges already from the foregoing, the invention is in no way limited to those of its types of application and embodiments which have been more especially envisaged; it encompasses, on the contrary, all modifications.

I claim:

1. Elastic support of the type comprising at least one rubber cushion between two tubular reinforcements or coaxial bushes, the inner bush being in at least two elements spaced from one another on mounting by a central mandrel so as to provide a separation between the edges of said elements, the major portion of the cross-section of the elastic cushion facing the respective edges of the two elements of the inner bush defining gaps whose cross-section extends, in the tangential direction, over a distance of the order of two to three times the separation between said edges.

2. Support according to claim 1, wherein the depth of the gaps, in the radial direction, is almost equal to the thickness of the elastic cushion in the remaining solid portions.

3. Support according to claim 1, wherein the cross-sections of the gaps have an eliptical shape.

4. Support according to claim 1, wherein the mandrel is of hard plastics material.

5. Support according to claim 1, wherein the mandrel is carried for the expansion operation, by a rod with a conical head, which rod is then removed.

6. Support according to claim 1, wherein the inner reinforcing elements are obtained by stamping.

7. An elastic suspension comprising an elastic support according to claim 1.

8. Method for obtaining an elastic support assembly of the type defined in claim 1, with an inner reinforcement constituted by two elements each being a little less than a half cylinder, comprising first molding and vulcanising the assembly, the respective edges of the two said elements being contiguous, cores being provided for the formation of lateral gaps, and then, said cores being removed, an extension operation is effected by the introduction of a central mandrel.

* * * * *